No. 644,706. Patented Mar. 6, 1900.
H. M. GIFFORD.
SCREW SLED BRAKE.
(Application filed Dec. 30, 1899.)
(No Model.)

Witnesses
Ralph A. Shepard
H. B. Griffith

Inventor
Henry M. Gifford
by Frank S. Applenan
Attorney

THE NORRIS PETERS CO., PHOTO-LITHO., WASHINGTON, D. C.

UNITED STATES PATENT OFFICE.

HENRY M. GIFFORD, OF UNION, WISCONSIN.

SCREW SLED-BRAKE.

SPECIFICATION forming part of Letters Patent No. 644,706, dated March 6, 1900.

Application filed December 30, 1899. Serial No. 742,052. (No model.)

*To all whom it may concern:*

Be it known that I, HENRY M. GIFFORD, a citizen of the United States of America, residing at Union, in the county of Pierce and State of Wisconsin, have invented certain new and useful Improvements in Screw Sled-Brakes, of which the following is a specification, reference being had therein to the accompanying drawings.

This invention relates to sleds, and more particularly to brakes therefor.

One object of the invention is to provide a novel brake which can be applied and released by the rotation of a crank within easy reach of the driver.

A further object of the invention is to provide a brake for sleds composed of few parts which will prove strong, durable, and efficient.

With the above and other objects in view the invention consists in the details of construction and the arrangement and combination of parts to be hereinafter more fully set forth and specifically claimed.

In describing the invention in detail reference will be had to the accompanying drawings, forming part of this specification, wherein like characters denote corresponding parts in the several views, and in which—

Figure 1:
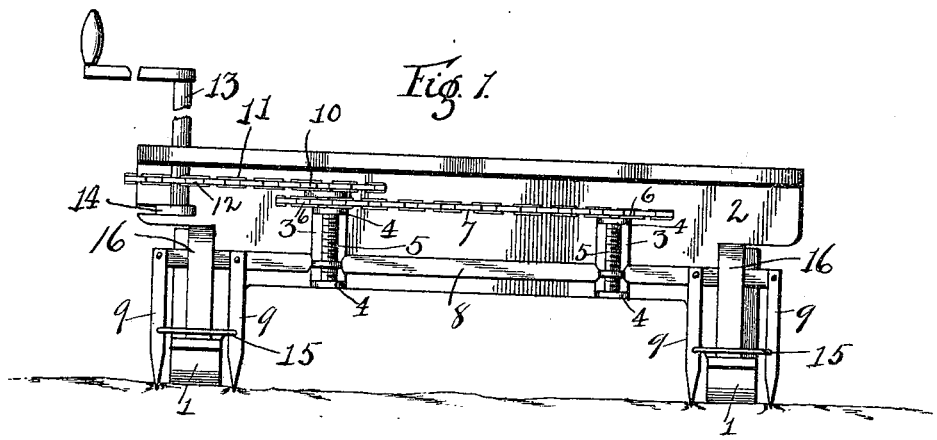
Figure 2:
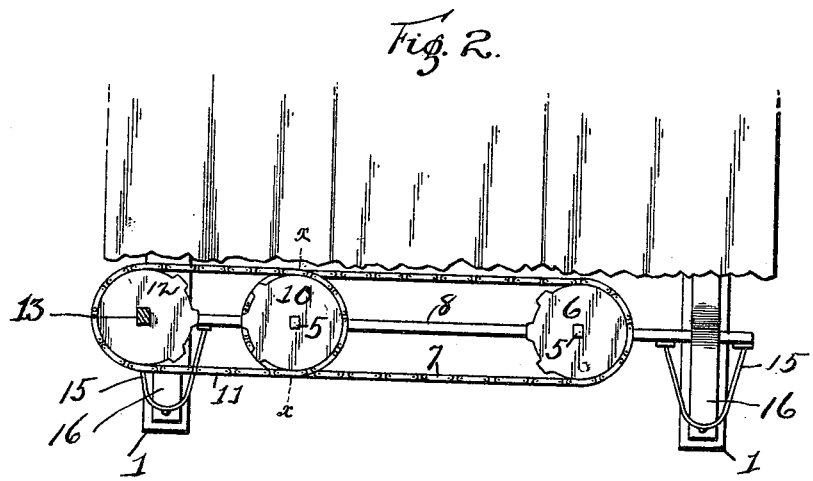
Figure 3:
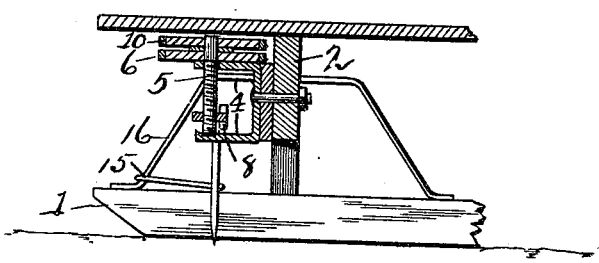

Figure 1 is a view in elevation of a sled with the invention applied. Fig. 2 is a top plan view thereof, and Fig. 3 is a sectional view taken on the line $x$ $x$ of Fig. 2.

In the drawings, 1 indicates the sled-runners, and 2 a bolster connecting the runners, and on the front thereof are attached brackets 3, having extensions 4 4, the upper of which are provided with apertures. Shafts 5 are journaled in the apertures of the upper extensions and rest on the upper surface of the lower extension and have angular upper ends to receive the sprocket-wheels 6, connected by a sprocket-chain 7.

The brake-beam 8 is supported by the threaded shafts 5, and the beam in turn is provided with prongs 9, one extending on each side of the runners for engaging the ice or snow when the brake is applied. The second wheel 10, mounted on one of the shafts, is driven by a chain 11, taking motion from the sprocket-wheel 12. The crank-lever 13 is journaled in a bracket 14, attached to the sled, and the wheel 12, being mounted on the crank-lever, is rotated therewith.

From the foregoing it will be observed that by turning the crank-lever to the right the brake-beam will be lowered and the brake applied and a reverse movement of the crank will elevate the brake.

The links 15 comprise wires in the form of loops embracing the stays 16, with their ends attached to the prongs to prevent the rearward displacement of said prongs.

Having thus fully described my invention, what I claim, and desire to secure by Letters Patent, is—

1. In combination with a sled having a bolster connecting the runners, brackets having upper and lower extensions attached to said bolster, threaded shafts journaled in apertures in the upper extensions and resting on the upper surface of the lower extension, a brake-beam threaded on the shafts and having depending prongs on each side of the runners, as and for the purpose described.

2. In combination with a sled having a bolster connecting the runners, brackets attached to said bolster, shafts having a suitable brake-beam attached thereto, journaled to the brackets, said shafts having angular upper ends, sprocket-wheels thereon, a chain, and suitable operating means connected to one of said sprocket-wheels, as and for the purpose set forth.

3. In combination with a sled having a bolster connecting the runners, shafts having suitable brake-beam attached thereto, wheels connected by a sprocket-chain on the upper end of said shafts, a crank-lever having a sprocket-wheel on its lower end and a chain connecting it to a second wheel on one of the shafts, as and for the purpose described.

In testimony whereof I affix my signature in the presence of two witnesses.

HENRY M. GIFFORD.

Witnesses:
W. C. OWEN,
F. E. BAKER.